Dec. 16, 1924.
J. A. KIMBALL
1,519,917
LAMP ADJUSTER
Filed Oct. 5, 1923
2 Sheets-Sheet 1
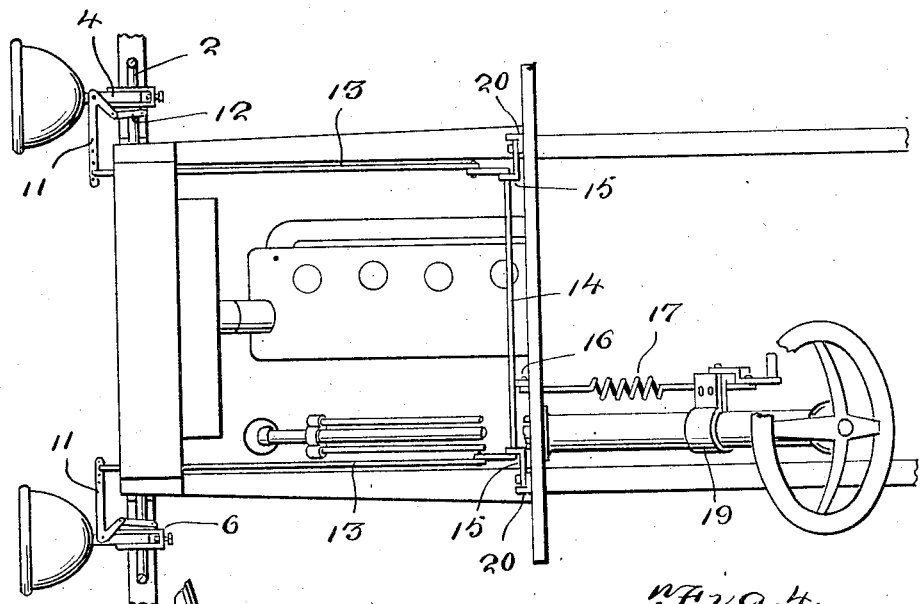
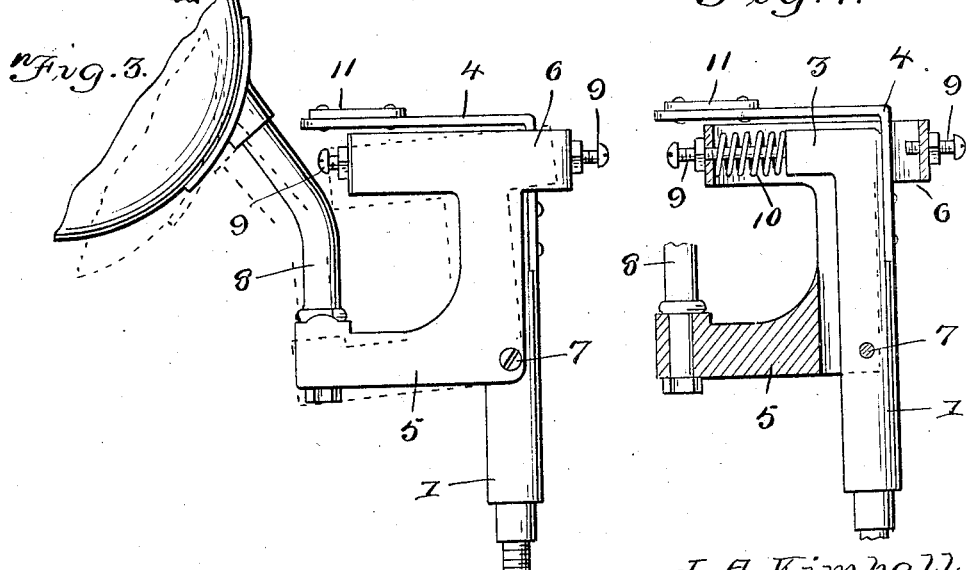
WITNESS:
E. R. Ruppert.
J. A. Kimball
INVENTOR
BY Victor J. Evans
ATTORNEY

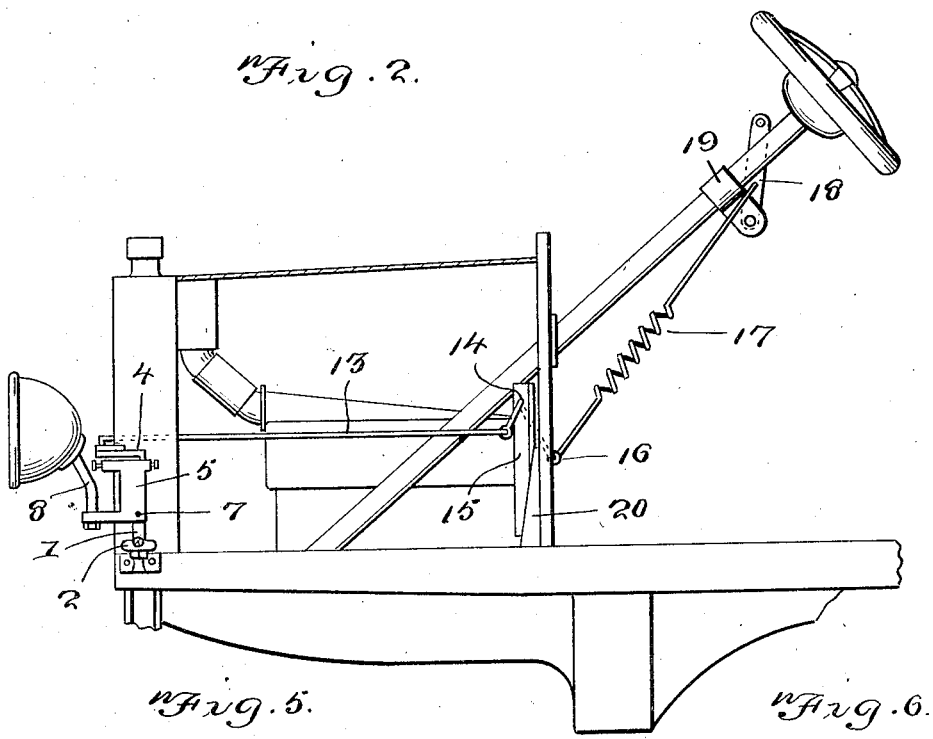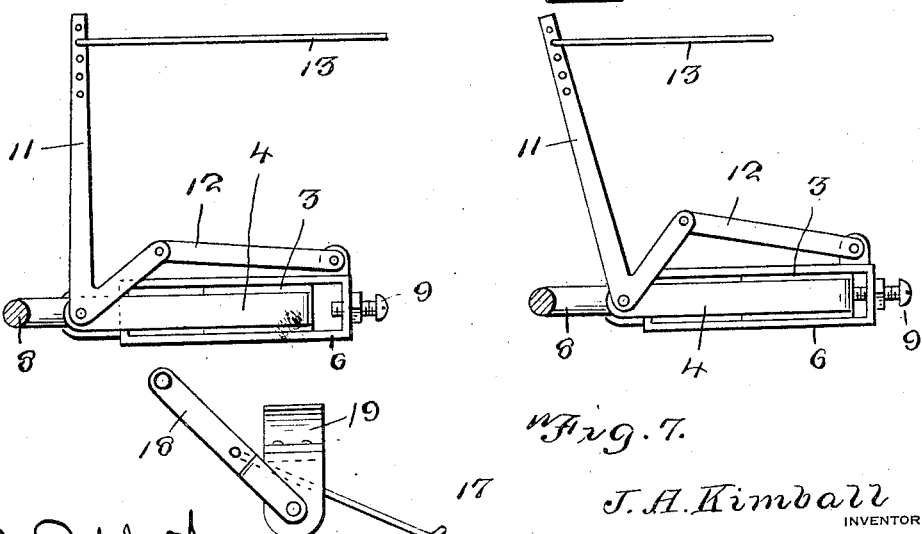

Patented Dec. 16, 1924.

1,519,917

UNITED STATES PATENT OFFICE.

JOHN A. KIMBALL, OF TAYLORVILLE, ILLINOIS.

LAMP ADJUSTER.

Application filed October 5, 1923. Serial No. 666,684.

*To all whom it may concern:*

Be it known that I, JOHN A. KIMBALL, a citizen of the United States, residing at Taylorville, in the county of Christian and State of Illinois, have invented new and useful Improvements in Lamp Adjusters, of which the following is a specification.

This invention relates to improvements in motor vehicles, the general object of the invention being to provide means for tilting the headlamps downwardly to cast the rays of light upon the road immediately ahead of the vehicle so as to prevent blinding of pedestrians and the operators of other vehicles on the road ahead.

Another object of the invention is to provide means for operating the tilting means from a point adjacent the driver's seat.

A further object of the invention is to so form and arrange the parts that they cannot rattle while the car is in motion and also to make the invention readily applicable to existing models of vehicles.

This invention also consists in certain other features of construction and in the combination and arrangement of the several parts, to be hereinafter fully described, illustrated in the accompanying drawings and specifically pointed out in the appended claims.

Figure 1 is a plan view showing the invention in use.

Figure 2 is an elevation.

Figure 3 is an enlarged elevation of one of the lamp carrying members.

Figure 4 is a sectional view through such member.

Figure 5 is a plan view showing the parts in one position.

Figure 6 is a similar view but showing the parts in another position.

Figure 7 is a view of the operating lever and the bracket for attaching the same to the steering post.

In these views, 1 indicates the post which is placed in each of the lamp brackets 2 of the vehicle after the lamps have been removed therefrom. This post is provided with a right angular extension 3 and an L-shaped arm 4 is fastened to the upper end of the post and has one part spaced above the extension. A substantially L-shaped member 5, having a yoke 6 at its upper end, is pivoted to the post by the pin 7 and the lamp standard 8 is carried by the lower outer part of this member. The yoke 6 embraces the upper end of the post and its extension and set screws 9 are arranged in the ends of the yoke with their inner ends arranged to engage the post and its extension to limit the movement of the member 5. A spring 10 is arranged between the front end of the yoke and the extension and tends to hold the member 5 in a position with the set screw 9 at the rear of the yoke against the post. In this position the lamp is tilted downwardly so that the rays of light are cast upon the road directly in front of the vehicle. As will be seen the member 5 with its yoke 6 constitutes a housing which embraces the upper part of the post in such a manner that the part 3 of the post acts as guiding means for the housing and prevents lateral movement of the same. The parts are so arranged that they will tend to move downwardly under the action of gravity as the lamp standard is connected with the outer part of the housing or member 5 so that the weight of the parts tends to help the spring 10 to hold the parts with the lamp in inclined position. The means for swinging the member 5 into upright position so that the rays of light will be cast ahead in the usual manner comprises a bell crank 11 pivoted to the arm 4 and connected with the yoke by the link 12 so that when the bell crank is pulled upon the yoke will be pressed rearwardly by the link and against the action of the spring so that the member or housing 5 will be moved to an upright position with the lamp in proper position for illuminating the road ahead. The bell cranks 11 are connected by the rods 13 with the cranked ends of a shaft 14 which is journaled in the brackets 15 supported by the dash of the vehicle and the crank 16 of the shaft is connected by the spring member 17 with an operating lever 18 which is supported on the steering post of the vehicle by the clamp 19. When the lever 18 is swung upwardly to the position shown in Figure 2 the tension on the spring member 17 will cause the shaft 14 to be moved rearwardly so that its cranked ends will exert a pull upon the rods 13 which will move the bell cranks to the position they occupy in Figure 5 and thus the lamp supporting members 5 will be moved to an upright position to hold the lamps in proper running position. When it is desired to prevent the glare from the lamps from affecting other drivers or pedestrians the lever 18 is swung downwardly so as to permit the springs 10 to tilt the lamp carrying members 5 so that the rays of light are reflected downwardly upon the road close to the vehicle. This will prevent blinding of persons in front of the vehicle while giving the driver of the vehicle sufficient illumination to prevent him running off the road or striking objects in the road.

The springs and the arrangement of the parts will prevent rattling of the parts as they will be held under tension at all times. The parts are adjustable by the set screws 9 to give the proper movement of the lamp carrying members and the rods 13 are adjustably connected with the bell cranks by providing the plurality of holes in the bell cranks for receiving the ends of the rods. I prefer to connect the brackets 15 with the angle iron supports 20 of the dash by utilizing some of the bolts of such supports. In this way the invention can be attached to a vehicle without calling a skilled mechanic.

The extension 3 will prevent side play of the parts as it acts as a guiding means for the member 5 and the said member may be formed in the shape of a housing to enclose the spring 10 and the other parts to protect them from the elements.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. In combination with a motor vehicle and its headlamp, a stationary support for the lamp having a horizontally extending guiding member, a housing having its lower part pivotally connected with the support and its upper part embracing the guiding member, the lamp having its standard connected with the housing in such a manner that the weight of the parts tends to hold the housing in its forward tilted position, stops on the upper part of the housing adapted to engage parts of the support for limiting the movement of the housing and means for moving the housing into upright position and holding it there against the action of gravity.

2. In combination with a motor vehicle and its headlamp, a stationary support for the lamp having a horizontally extending guiding member, a housing having its lower part pivotally connected with the support and its upper part embracing the guiding member, the lamp having its standard connected with the housing in such a manner that the weight of the parts tends to hold the housing in its forward tilted position, stops on the upper part of the housing adapted to engage parts of the support for limiting the movement of the housing, a spring assisting gravity to hold the housing in tilted position and means for moving the housing into upright position and holding it there against the action of gravity and the spring.

3. In combination with a motor vehicle and its head lamp, an upright support of inverted L-shape, a housing having its lower part pivotally connected with the support and its upper part embracing the horizontal part of the support, this horizontal part acting as guiding means for the housing, the lamp having its standard connected with the lower outer part of the housing so that the weight of the parts acts to tilt the housing on the support, a spring between the housing and a part of the support for assisting gravity and tilting the housing, adjustable stops at the ends of the upper part of the housing for engaging the support for limiting the movement of the housing, and manually operated means for moving the housing into upright position and holding it there against the action of the spring and gravity.

4. In combination with a motor vehicle and its headlamp, a supporting post of inverted L-shape, a housing pivoted to the post and having its upper part embracing the horizontal part of the post so that it is held against lateral movement by said part, the lamp having its standard connected with the lower outer part of the housing, a spring within the housing and engaging a part of the post for holding the housing in tilted position, a bell crank, means for supporting the same from the post, a link connected with one arm of the bell crank and with the side of the housing at the top thereof, a manually operated member and a link connecting the same with the other arm of the bell crank, said link passing through the radiator of the vehicle.

5. In combination with a motor vehicle and its headlamps, a housing to which each lamp is connected, a supporting post for each housing having a horizontally extending guiding part for the housing, the housing being pivoted to the post so that it has tilting movement thereon, spring means between each housing and the post for tilting the housing, adjustable stops on each housing for limiting its movement on the post, a horizontally arranged bell crank carried by each post, a link connecting one arm of each bell crank with one side of each housing adjacent the top thereof, the other arm of the bell crank extending inwardly towards the radiator of the vehicle, a crank shaft on the dash of the vehicle, links connecting the cranks with the inwardly extending arms of the bell cranks, an operating lever on the steering post of the vehicle, and connecting means between said lever and the crank shaft.

6. In combination with a motor vehicle and its headlamps, a housing to which each lamp is connected, a supporting post for each housing, the housing being pivoted to the post so that it has tilting movement thereon, spring means between each housing and the post for tilting the housing, adjustable stops on each housing for limiting its movement on the post, a bell crank carried by each post, a link connecting one arm of each bell crank with one side of each housing adjacent to top thereof, the other arm of the bell crank extending inwardly towards the radiator of the vehicle, a crank shaft on the dash of the vehicle, links connecting the cranks with the inwardly extending arms of the bell cranks, said links passing through the radiator, an operating lever on the steering post of the vehicle, connecting means between said lever and the crank shaft and a spring in such connecting means.

In testimony whereof I affix my signature.

JOHN A. KIMBALL.